Oct. 13, 1925.
H. D. CHURCH
MOTOR VEHICLE
Filed June 6, 1919
1,556,677
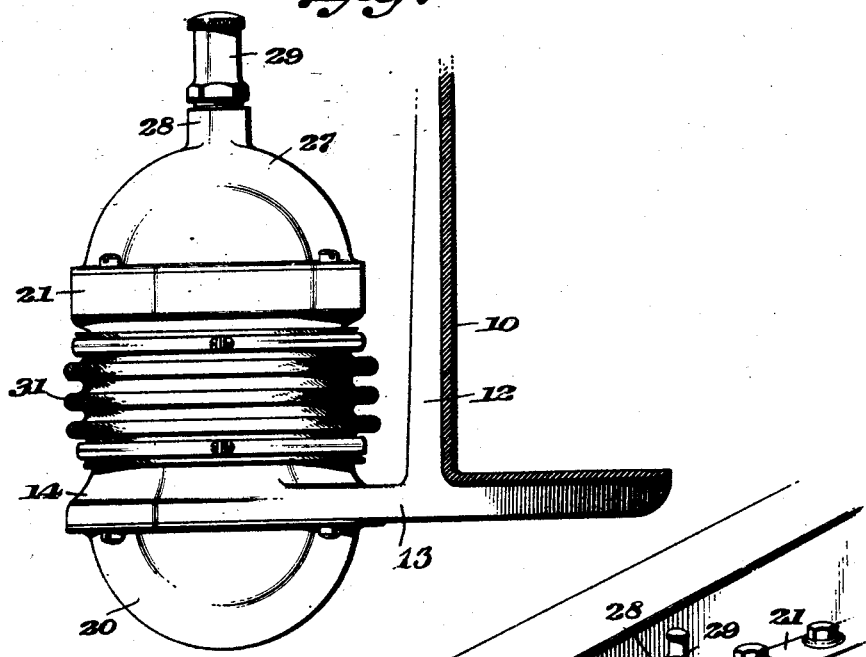
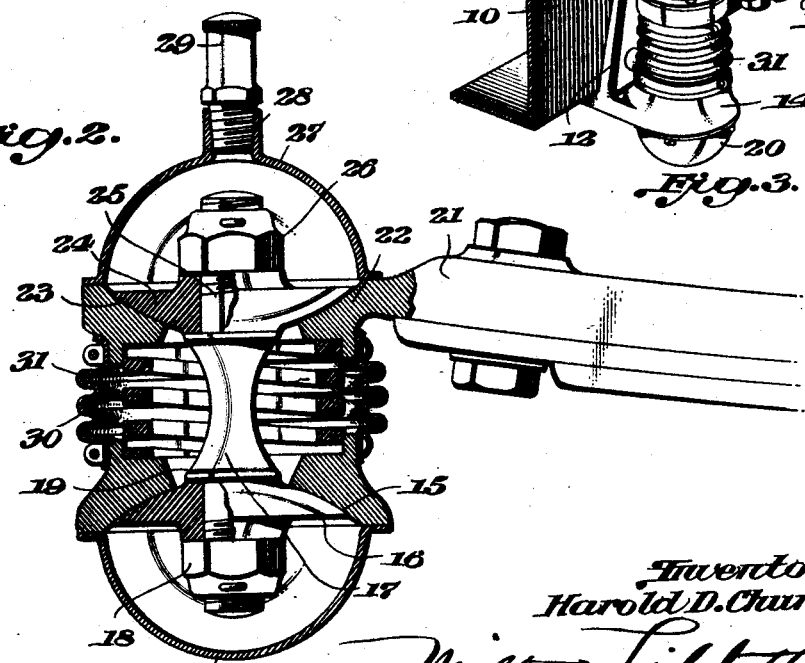
Inventor,
Harold D. Church,
By Milton Tibbetts
Atty.

Patented Oct. 13, 1925.

1,556,677

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed June 6, 1919. Serial No. 302,125.

*To all whom it may concern:*

Be it known that I, HAROLD D. CHURCH, a citizen of the United States, and resident of Detroit, Wayne County, State of Michigan, have invented certain new and useful Improvements in Motor Vehicles, of which the following is a specification.

This invention relates to motor vehicles and more particularly to spring shackles for such vehicles.

One object of the invention is to provide means for automatically taking up wear at the joints between the parts of a shackle connecting the spring and the frame.

Another object of the invention is to provide an enclosed construction adapted to retain lubricant effectually and exclude dust from the space surrounding the shackle member.

Another object of the invention is to provide effective means for excluding the dust from the space surrounding the shackle members.

With these objects and others in view, the invention is embodied in preferable form in the construction and arrangement hereinafter described and illustrated in the accompanying drawings, in which:

Fig. 1 is a rear view in elevation of the device applied to a frame which is shown partly in section, Fig. 2 is a sectional view at right angles to Fig. 1, and Fig. 3 is a perspective view showing the device in connection with the frame and the spring.

Referring to the drawings, the device is shown as applied to the front end of the rear spring of a motor vehicle. 10 indicates a part of the frame and 11 a spring adapted to support said frame.

12 indicates a bracket attached to the frame and which has an arm 13 having at its outer end a socket member or eye 14, the inner surface of which is curved to provide a partly spherical seat 15 against which is adapted to bear the spherical face of a hardened steel washer 16, mounted on the stem of a bolt 17. The bolt is provided with a nut 18 adapted to retain the spherical washer 15 in position against a shoulder 19 of the bolt.

A cap 20 covers the lower end of the bolt and is secured to the socket member 14. This cap forms part of the wall of a lubricant retaining receptacle.

Secured to the upper surface of the spring is a bracket 21, preferably a forging, having an eye 22 which is provided with an interior surface 23 spherically and concavely curved. This curved surface constitutes a seat for a hardened ball washer 24 similar to the lower washer 16 and having a spherical surface adapted to bear against the concave surface of the eye 22. This washer is mounted on the upper stem portion 25 of the bolt 17 and is held in position by means of a nut 26. A cap 27 encloses the nut and is secured to the member 22 and forms the upper part of a lubricant retaining chamber. This cap is provided with an open boss 28 at its upper end through which lubricant is adapted to be admitted and which opening is closed by a screw plug 29.

The intermediate portion of the bolt 17 is surrounded by a spiral spring 30 which presses against the inner surfaces of the two cylindrical socket members 14 and 22 and serves to press the same into close but yielding contact with the spherical surfaces of the bolt washers 16 and 24. A collapsible cover 31, preferably of rawhide, surrounds the spring and is clipped to the eye 22 and socket member 14 in any suitable manner and serves to exclude dust from the central part of the shackle, and also to retain the lubricant within the chamber in which the shackle member is mounted.

With the construction above described, it will be seen that the spring 30 keeps the spherical surfaces of the two ball washers and the corresponding spherical seats of the frame and spring members in close but yielding contact while said spherical surfaces accommodate themselves to any wear between the connected parts so as to always maintain a close contact.

Having thus described my invention, what I claim and desire to secure by Letters Patent is:

1. A spring shackle having spherically curved surfaces on the parts to be connected and having a shackle member provided with spherical members interfitting with the corresponding spherical surfaces of said parts and resilient means carried by said shackle for seating said interfitting parts.

2. In combination with the frame of a motor vehicle and a frame supporting spring, a bracket member attached to each of said parts and spaced apart, a shackle member connecting said bracket members, said shackle member and bracket members having interfitting spherical surfaces, and a spring surrounding the shackle member and bearing against said bracket members on one side to hold them aginst the shackle member.

3. In combination with a frame bracket, a spring bracket, a shackle member having means spaced apart for engaging said brackets, a spring for pressing the brackets and shackle member together, and a collapsible cover enclosing said spring.

4. In combination, a vehicle frame having a bracket rigidly attached thereto and a vehicle spring having a bracket secured thereto, said brackets having bearings formed thereon, a connecting member for said brackets seated in said bearings and resilient means for seating said brackets on said connecting member.

5. In combination, a vehicle frame having a bracket rigidly attached thereto and a vehicle spring having a bracket secured thereto, said brackets having spherical bearings formed thereon, a connecting member for said brackets having interfitting portions seated in said bearings and resilient means for maintaining said bearings and said connecting member in yieldable engagement with each other.

6. In combination with the frame of a motor vehicle and a frame supporting spring, a bracket member attached to each of said parts and spaced apart, a shackle member connecting said bracket members, said shackle member and bracket members having interfitting spherical surfaces, and means on said shackle member pressing said shackle member against the bracket members.

7. In combination with the frame of a motor vehicle and a frame supporting spring, a shackle member having spherical surfaces at its ends, brackets on the frame and spring respectively and having spherical surfaces co-operating with the spherical surfaces on the shackle member, and cover devices attached to the brackets and enclosing the ends of the shackle member for retaining lubricant on the spherical surfaces.

8. In a spring shackle construction, the combination with the two parts to be connected by the shackle, each of said parts having a spherical contact surface, of a shackle member comprising a shank and spherical end portions co-operating with the spherical surfaces of said parts, and cover devices secured to said parts and covering the ends of said shackle member.

9. In a spring shackle construction, the combination with the two parts to be connected by the shackle, each of said parts having a spherical contact surface, of a shackle member comprising a shank and spherical end portions co-operating with the spherical surfaces of said parts, a spring arranged between the two parts and surrounding the shank of the shackle member and adapted to separate the parts to keep the spherical surfaces in contact, and cover devices secured to said parts and covering the ends of said shackle member.

10. A shackle connection adapted to secure two members in movable spaced relation comprising a bolt member having spherical bearings to hold the said members together and a spring surrounding the bolt to hold said members apart.

11. A shackle connection adapted to secure two members in spaced relation comprising spherical bearings connected by a bolt to hold the members together and spring means to hold the members apart.

In testimony whereof I affix my signature.

HAROLD D. CHURCH.